(12) United States Patent
Giddons et al.

(10) Patent No.: US 9,370,882 B2
(45) Date of Patent: Jun. 21, 2016

(54) COST EFFECTIVE AND EFFICIENT AIR CIRCULATION SYSTEM FOR A VEHICLE HAVING ROTOMOLDED BODY ASSEMBLY

(75) Inventors: Nigel Giddons, Novi, MI (US); John William Taylor, Novi, MI (US)

(73) Assignee: TATA TECHNOLOGIES PTE LIMITED, Singapore (SG)

( * ) Notice: Subject to any disclaimer, the term of this patent is extended or adjusted under 35 U.S.C. 154(b) by 742 days.

(21) Appl. No.: 13/276,799

(22) Filed: Oct. 19, 2011

(65) Prior Publication Data

US 2012/0100792 A1    Apr. 26, 2012

(30) Foreign Application Priority Data

Oct. 22, 2010 (IN) .......................... 2941/MUM/2010

(51) Int. Cl.
*B60H 1/24* (2006.01)
*B29C 41/04* (2006.01)

(52) U.S. Cl.
CPC . *B29C 41/04* (2013.01); *B60H 1/24* (2013.01)

(58) Field of Classification Search
CPC ...... B60H 1/24; B29C 41/04; B60L 11/1874; B60L 11/1877; B60K 11/06
USPC ............... 454/144, 162, 164; 296/181.1, 208; 180/68.1
See application file for complete search history.

(56) References Cited

U.S. PATENT DOCUMENTS

| | | | | |
|---|---|---|---|---|
| 2,087,651 | A * | 7/1937 | Mygland | B60H 1/262 296/91 |
| 3,696,732 | A * | 10/1972 | Rodgers | B60J 1/2002 296/91 |
| 3,908,900 | A * | 9/1975 | Smith | 237/12.3 A |
| 4,124,246 | A * | 11/1978 | Brown et al. | 296/190.08 |
| 4,216,839 | A * | 8/1980 | Gould et al. | 180/65.1 |
| 4,460,055 | A * | 7/1984 | Steiner | 180/7.1 |
| 4,498,700 | A * | 2/1985 | Fujii et al. | 296/78.1 |
| 4,577,720 | A * | 3/1986 | Hamane et al. | 180/229 |
| 4,953,449 | A * | 9/1990 | Jackson | B60H 3/0616 454/138 |
| 5,490,572 | A * | 2/1996 | Tajiri et al. | 180/65.1 |
| 5,704,644 | A * | 1/1998 | Jaggi | 280/796 |
| 6,053,563 | A * | 4/2000 | Edgeller et al. | 296/181.2 |
| 6,094,927 | A * | 8/2000 | Anazawa et al. | 62/239 |
| 6,309,012 | B1 * | 10/2001 | Fryk et al. | 296/211 |
| 6,361,429 | B1 * | 3/2002 | Pawlak et al. | 454/139 |
| 6,478,369 | B1 * | 11/2002 | Aoki et al. | 297/180.13 |

(Continued)

FOREIGN PATENT DOCUMENTS

JP    A-2007-112268    5/2007
WO    WO 2010/076453 A1    7/2010

*Primary Examiner* — Steven B McAllister
*Assistant Examiner* — Jonathan Cotov
(74) *Attorney, Agent, or Firm* — Oliff PLC

(57) ABSTRACT

The present invention provides a cost effective and efficient air circulation system for a rotomolded vehicle body, comprising: at least one inlet vent disposed at the lower front of the rotomolded body assembly for receiving the air; an outlet vents comprising at least one venting vane disposed at floor of the rotomolded body assembly for receiving the air from inlet vent and disposing the air to underside of the floor for cooling of the power train system located beneath the floor. A roof of the rotomolded body assembly receiving the air from inlet vents and disposing in the void of the rotomolded body assembly for cooling the passenger area, wherein the air is forced-in from inlet vents and forced-out through the outlet vents. A high volumetric throughput pressure is maintained between inlet and outlet vents comprising the said venting vane due to position thereof.

7 Claims, 4 Drawing Sheets

(56) References Cited

U.S. PATENT DOCUMENTS

| | | | |
|---|---|---|---|
| 6,497,275 B1 * | 12/2002 | Elliot | 165/204 |
| 6,631,775 B1 * | 10/2003 | Chaney | 180/68.5 |
| 6,702,370 B2 * | 3/2004 | Shugar et al. | 296/211 |
| 7,334,834 B2 * | 2/2008 | Hill et al. | 296/190.09 |
| 7,353,900 B2 * | 4/2008 | Abe et al. | 180/68.5 |
| 7,404,580 B2 * | 7/2008 | Michael | 280/837 |
| 7,713,103 B2 * | 5/2010 | Burgoyne | 440/88 C |
| 7,722,108 B2 * | 5/2010 | Ueda | B62J 17/04 296/78.1 |
| 7,784,844 B2 * | 8/2010 | Sato | 296/24.34 |
| 8,297,387 B2 * | 10/2012 | Kadoi et al. | 180/65.1 |
| 8,366,524 B2 * | 2/2013 | Ichikawa et al. | 454/69 |
| 8,408,635 B2 * | 4/2013 | Zhu | 296/180.1 |
| 8,459,727 B2 * | 6/2013 | Mayr et al. | 296/190.09 |
| 8,512,109 B2 * | 8/2013 | Ueda et al. | 454/130 |
| 2002/0153178 A1 * | 10/2002 | Limonius | 180/2.2 |
| 2003/0080532 A1 * | 5/2003 | Monary | 280/282 |
| 2004/0201247 A1 * | 10/2004 | Gehman et al. | 296/168 |
| 2007/0187990 A1 * | 8/2007 | Shahbazi | B62D 37/02 296/180.1 |
| 2008/0289896 A1 * | 11/2008 | Kosuge et al. | 180/312 |
| 2010/0072782 A1 * | 3/2010 | Modzik et al. | 296/190.09 |
| 2010/0116568 A1 * | 5/2010 | Kadoi | 180/65.1 |
| 2010/0225264 A1 | 9/2010 | Okuda et al. | |
| 2011/0269388 A1 * | 11/2011 | Meulenbelt | B60H 1/3202 454/76 |

* cited by examiner

COST EFFECTIVE AND EFFICIENT AIR CIRCULATION SYSTEM FOR A VEHICLE HAVING ROTOMOLDED BODY ASSEMBLY

FIELD OF THE INVENTION

The present invention relates to air circulation system for vehicles and more particularly the present invention relates to a cost effective and efficient air circulation system for a vehicle having rotomolded body assembly.

BACKGROUND OF THE INVENTION

Vehicle air circulation and ventilation systems have long been utilized in vehicles to provide comfort by way of constant supply of fresh air to the vehicle occupants. Initial air circulation and ventilation systems comprised of a simple duct that was opened or closed by a manually operated valve directing outside ambient air to the vehicle's interior. Advances made over the years includes, utilizing of various vents along with an electrically driven fan or impeller directing the outside ambient air around the vehicle for air circulation and ventilation purposes.

Most air circulation and ventilation systems in vehicles require custom fabricated duct work to transfer ambient air in and around the vehicle, in such a scenario the cost for manufacturing, tooling, installation and maintenance of the electrically driven fan or impeller adds on cost of the vehicle as well the complexity in the manufacturing process. In addition, it requires separate ducts as well as typical additional vents to be made in the vehicle to enable the air circulation and ventilation in the vehicle.

One of the disadvantages of using electrically driven fan or impeller along with custom fabricated ductwork for pulling the ambient air inside the vehicle is that it may not provide efficient air circulation in the rear compartment as compared to front compartment of the vehicle. At the same time, it may not be cool the power train system. Another disadvantage is that the fan or impeller can make a noise once it gets old hence the maintenance cost are inevitable.

With the advent of polymer molded vehicle bodies, it is possible to simplify and cut down the cost of air circulation and ventilation systems.

Some of the prior arts known to us, which deal with air circulation and ventilation system for cooling of the power train systems as well as the passenger area in the vehicle, are as follows:

US20100225264 filed by Okuda et al teaches that a system for cooling a battery mounted on a vehicle using air within a vehicle, independent of the travelling state of the vehicle. The air within a vehicle compartment is guided to a battery mounted on a vehicle to cool the battery. A controller determines a basic fan speed "v" of the cooling fan based on a battery temperature and an ambient temperature. Further, the controller calculates an increment "δv" of the fan speed in accordance with the vehicle speed and the degree of window opening and determines a final fan speed "V" according to "V=v+δv", to drive the cooling fan. By controlling the fan speed to increase, it is possible to cool the battery even when the base pressure of the inlet-side static pressure of the cooling fan becomes negative pressure compared to when the windows are closed. However, the ventilation system requires a separate pathway from exterior to interior.

JP2007112268 filed by Hiroyuki et al teaches a method for cooling inverter and battery. This battery temperature optimizing system for vehicle includes a duct, which helps cabin communicate with vehicular exterior surrounding. The battery and the other heating element are disposed in series within the duct this battery temperature optimizing system further includes an airflow changer for changing an air circulation path in the duct based on temperatures of the battery. However, the ventilation system requires a separate pathway from exterior to interior.

WO2010076453 filed by Robert et al teaches that a device for cooling the battery or batteries of a motor vehicle, especially an electric vehicle, wherein said vehicle comprises of a temperature regulating unit provided with an evaporator arranged in the passenger compartment and a condenser arranged outside the passenger compartment. Said device is characterized in that it comprises an air conduit between the evaporator and the battery or batteries, for recuperating some of the cold air generated by the evaporator and sending it to the battery or batteries in order to cool same. However, this invention is using a conventional air conditioning cooler for cooling the battery or batteries of the motor vehicle.

However, difficulties have been encountered in obtaining uniform air distribution with adequate air exchange and maintaining high efficiency in the passenger area as well as power train systems of the vehicle at the lowest possible cost.

Thus, in the light of the above mentioned state of the art, it is evident that, there is a long felt need in the art to:

Provide cost effective and efficient air circulation and ventilation system in the vehicle;

Achieve sufficient air circulation to the passenger area as well as power train systems in the vehicle;

Use the vehicle body itself to act as a ventilation provider, thus eliminating the need of separate ducts as well as typical additional vents;

Reduce the machining and tooling cost involved in the production of air circulation and ventilation systems in the vehicle;

Effectively manage the inventory and logistic associated in the automobile industry for production, installation and maintenance of the air circulation and ventilation systems in the vehicles, thus reducing the cost and time factor; and Reduction the number of OEM suppliers engaged in production of the vehicle air circulation and ventilation systems in the vehicle.

OBJECTS OF THE INVENTION

The principal object of the present invention is to provide a cost effective and an efficient air circulation system for a vehicle having rotomolded body assembly.

Another object of the invention is to provide the use of the vehicular body to act as a ventilation enabler without adding separate ducts as well as typical additional vents.

A further object of the present invention is to provide sufficient air circulation to the passenger area as well as the power train systems by virtue of forward motion of the vehicle.

An additional object of the present invention is to provide a unique pathway by the rotomolding process to generate a cavity in the wall of the body of the vehicle for cooling of the power train systems as well as the passenger area using the ambient external air.

Still another object of the present invention is to reduce the machining and tooling cost involved in the production of air circulation and ventilation systems in the vehicle.

A still further object of the invention is to reduce the number of OEM suppliers engaged in production of the vehicle air circulation and ventilation systems in the vehicle.

SUMMARY OF THE INVENTION

Before the present systems and methods enablement are described, it is to be understood that this invention in not limited to the particular systems and methodologies described, as there can be multiple possible embodiments of the present invention and which are not expressly illustrated in the present disclosures. It is also to be understood that the terminology used in the description is for describing the particular versions or embodiments only, and is not intended to limit the scope of the present invention.

In one aspect of the invention, an air circulation system for rotomolded body assembly (100) is provided, the said system comprising; a lower body portion 10) having at least one first inlet vent (51) positioned at a front side (11a) of the lower body portion (10) and an air channel (14) having an air first outlet vent (52) comprising at least one venting vane disposed on the lower body portion (10), wherein the venting vane integrally molded therein; an upper body portion (30) mounted on the lower body portion (10). The upper body portion (30) comprises an air vent (7) integrally located and sandwiched between an exterior side (8) and an interior side (9) of the upper body portion (30). The air vent comprising at least one second inlet vent (6) and second outlet vents (5) characterized in that the high volumetric throughput pressure is maintained between at least one second inlet vent (6) and the second outlet vent (5) by virtue of the position thereof.

In another aspect of the invention, a cost effective and an efficient air circulation system is provided for a vehicle having rotomolded body assembly characterized in that the rotomolded interior body voids act a ventilation provider obviating the need of separate ducts as well as typical additional vents.

BRIEF DESCRIPTION OF DRAWINGS

The foregoing summary, as well as the following detailed description of preferred embodiments, are better understood when read in conjunction with the appended drawings. For illustrating the invention, there is shown in the drawings example constructions of the invention; however, the invention is not limited to the specific systems and methods and disclosed. In the drawings.

DETAILED DESCRIPTION OF THE INVENTION

Figure 1:
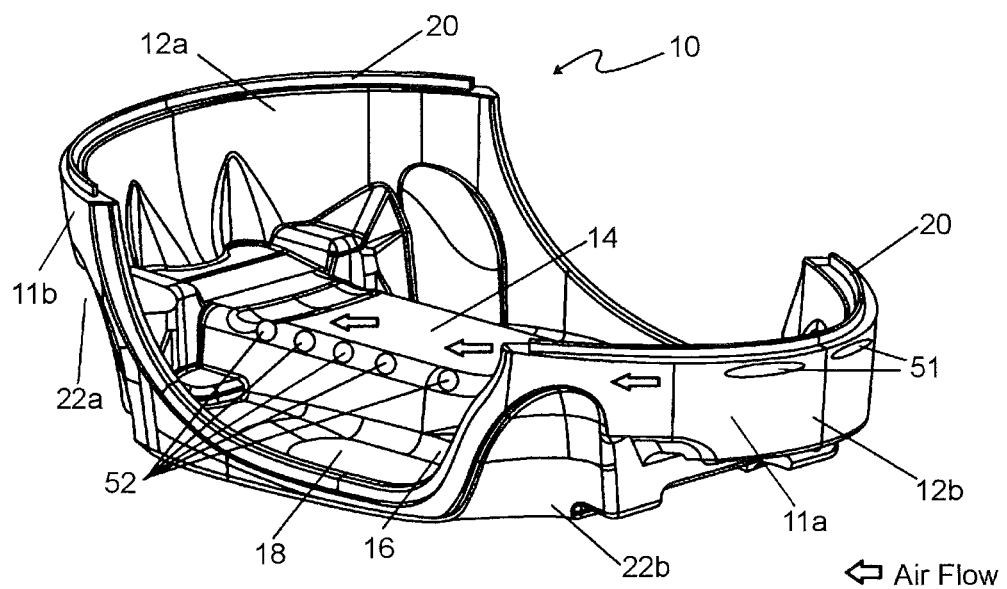
FIG. 1 illustrates how the air is circulated in the lower body portion of the rotomolded body assembly of the vehicle according to one exemplary embodiment of the invention.

Some embodiments of this invention, illustrating its features, will now be discussed:

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

DEFINITIONS OF THE TERMS

The term vehicle refer to at least one element that can be selected from the group comprising of motor vehicle, automobile, personal transport vehicle, automated guided vehicle, or self-propelled machines.

The terms front, rear, left or right side of the vehicle are to be interpreted in their common definition with respect to a vehicle.

The terms "system," "systems," "components" or "parts" refers to a common term "systems" and essentially mean the same.

The terms "outlet vent," or "outlet ventilation vent," refers to a common term "outlet vent" and essentially mean the same.

The terms "inlet vent," or "inlet ventilation vent," refers to a common term "inlet vent" and essentially mean the same.

Most heating and ventilation systems in vehicles require custom fabricated duct work as well as typical additional vents to transfer air around the vehicle, wherein the manufacturing, tooling, installation and maintenance cost of the electrically driven fan or impeller for air circulation and ventilation purposes in the vehicle which increases the manufacturing and maintenance cost of the vehicle quite considerably.

Accordingly, the present invention provides a cost effective and efficient air circulation system for a vehicle having rotomolded body assembly. In this invention, the air is forced through the forward motion of the vehicle, additional electrically driven fan or impeller is not required thereby saving the manufacturing, maintenance cost of the vehicle.

In one embodiment of the invention, the vehicle structure has rotomolded body assembly, wherein the load bearing automotive vehicle structure is made of polymeric material that does not require supporting metal sub-frame to provide desired stiffness, strength, and durability to the structure. Such a vehicle structure is achieved by the process of rotational molding of the polymeric material.

Rotational molding, also known as roto-molding or rotary molding is a molding process for manufacturing of hollow items. The polymeric members can be selected from the group of polyethylene, polyamides and polypropylene polymers, copolymers and blended compositions of the same. The rotational molding process is a high-temperature, low-pressure plastic-forming process that uses heat and biaxial rotation (angular rotation on two axes) to produce hollow, one-piece parts.

The rotational molding process has distinct advantages:
1. Manufacturing large, hollow parts is much easier by rotational molding than any other method.
2. Rotational molds are significantly cheaper than other types of mold.
3. Very little material is wasted using this process, and excess material can often be re-used, making it a very economically and environmentally viable manufacturing process.

Figure 4:
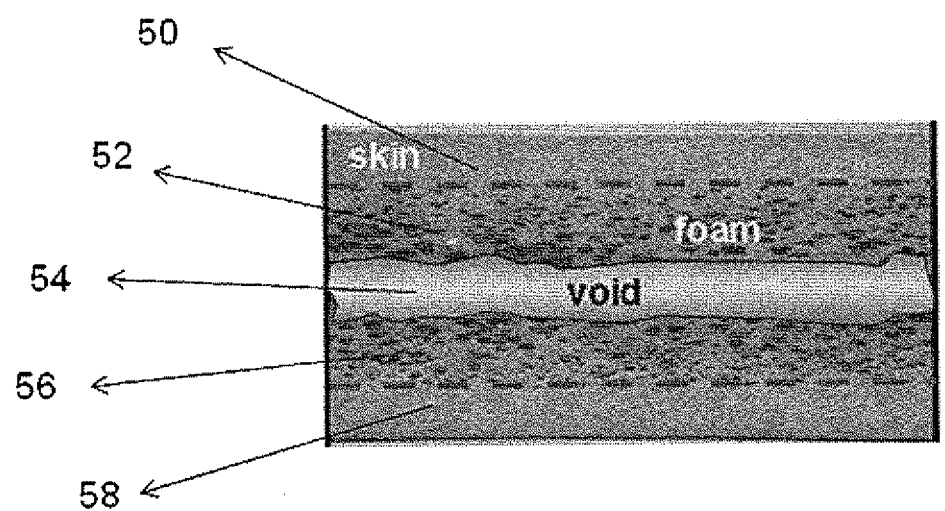
FIG. 4 illustrates a cross sectional representation of the wall of a rotomolded part indicating a central air cavity according to one exemplary embodiments of the invention

The rotational molding can be multilayered and includes foam layers to provide multifunctional improvements. The foam is created as separate layers within the cavity formed by the inner and outer solid plastic skins. Additionally, the foams layers are formed so as to leave a continuous air filled cavity within and throughout the body walls. FIG. 4 shows a schematic description of the cross section of wall the rotomolded part indicating a central air cavity according to one exemplary embodiments of the invention As shown in FIG. 4, the rotomolded body assembly (100) can be molded to have a skin or shell (approximate thickness 4-5 mm) enclosing inner layer of foam. The outer skin 50 is of 5 mm, the first foam layer 52 is of 10 mm size, the void space 54 (air) is of 10 mm, the second foam layer 56 and inner skin 58 is of 5 mm thickness. The minimum thickness of the complete section will be 40 mm and the nominal foam thickness is 10 mm.

In one embodiment of the invention the skins and the foam layers are used in creating the body of the vehicle, which is made from High Density Polyethylene; HDPE, will deliver the rigidity and safety. In the multilayered structure of the present invention, the layers adhere to each other to acquire desired stiffness, strength and durability.

According to one embodiment of the invention, the vehicle having rotomolded body assembly (100), wherein the rotomolded body assembly (100) having two portions namely a lower body portion (10) and an upper body portion (30). The lower body portion (10) and the upper body portion (30) are joined or fixed together to form a rotomolded body assembly (100) of the vehicle.

FIG. 1 illustrates how the air is circulated in the lower body portion of the rotomolded body assembly of the vehicle according to one exemplary embodiment of the invention. The lower body portion 10 of a rotomolded body assembly is manufactured by rotational molding process. As illustrated in FIG. 1, the lower body portion 10 is manufactured in such a way that it should be able to sustain the weight of one to four passengers without requiring any supporting metal structure. The lower body portion 10 has inner skin 12a and outer skin 12b as shown in FIG. 4. Foam is filled in between two skins of lower body portion 10 to provide the said structure required stiffness, strength and durability. The lower body portion 10 also has structural provision to attach power train system, air channel 14, still section 18 and forward floor 16 optimized structurally.

Figure 2:
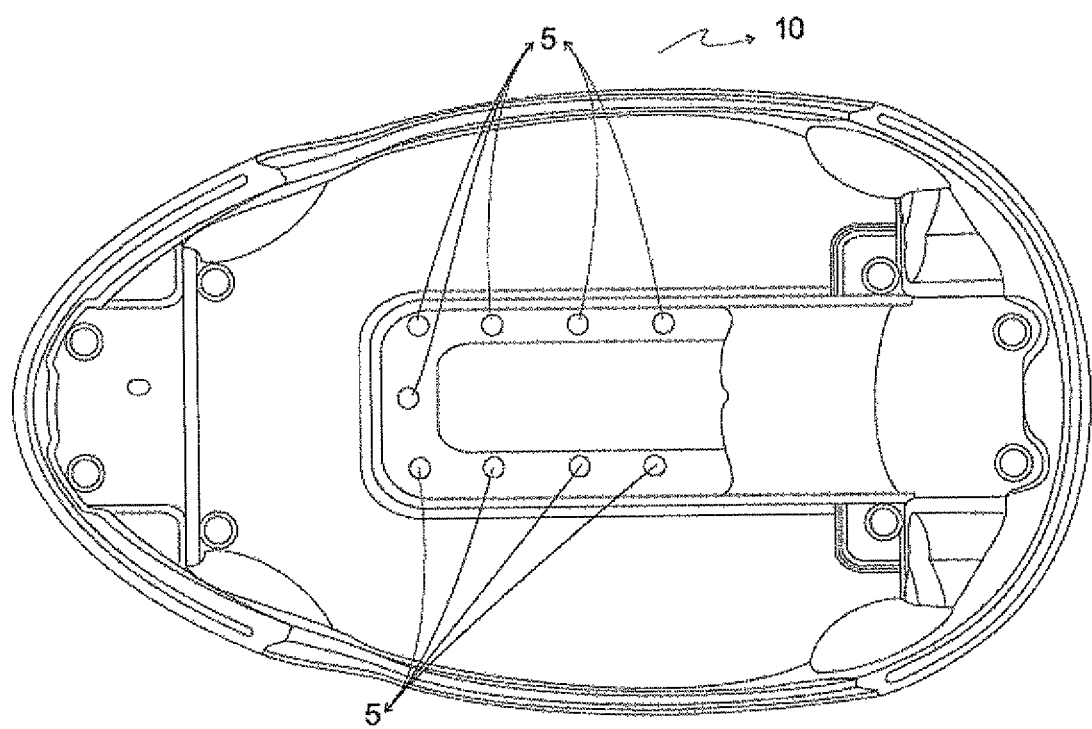
FIG. 2 shows the bottom view of the lower body portion of the rotomolded body assembly of the vehicle according to one exemplary embodiment of the invention.

According to one exemplary embodiment of the invention, one or more first inlet vents (6) are disposed at front of the lower body portion 10 of the rotomolded body assembly (100) for receiving the air. According to one exemplary embodiment of the invention, the first inlet vents (51) can be closed using the closing means, the said closing means can be selected one from the group of flap or sliding window, etc. According to another exemplary embodiment of the invention, each of the first inlet vents (51) may have further openings. Accordingly, to another exemplary embodiment of the invention, each of first inlet vents (51) may further have filter for filtering the particulate matter, odor or water from entering outside into inside of the vehicle. A first outlet vent (52) comprising at least one venting vane disposed at the air channel 14 of the rotomolded body assembly (100) for receiving the air from the first inlet vents (51) and disposing the air to underside of air channel 14 of the rotomolded body assembly (100) for cooling of the power train system located beneath air channel 14. The first outlet vents (52) disposed at the back side of the air channel 14 of the rotomolded body assembly (100) are shown in the FIG. 2 for receiving the air after cooling the power train system and disposing the same to the outside of the vehicle. The lower body portion 10 also has a raised securing element 20 used in securing said lower body portion 10 with upper half body portion 30.

According to one embodiment of the invention, the air circulation in the lower body portion 10 of the rotomolded body assembly (100) of the vehicle takes place in the following manner: the air is received via the first inlet vents (51) disposed at front of the lower body portion 10 of the rotomolded body assembly (100) and then the air is disposed to underside of air channel 14 of the rotomolded body assembly (100) for cooling of the power train system located beneath air channel 14 via the first outlet vent (52) comprising said venting vane disposed at the air channel 14 of the rotomolded body assembly (100) by virtue of the forward motion of the vehicle. The first outlet vent (52) comprising the said venting vane disposed at the back side of the air channel 14 of the rotomolded body assembly (100) are shown in the FIG. 2 for receiving the air after cooling the power train system and disposing the same to the outside of the vehicle. According to one embodiment of the invention, high volumetric throughput pressure is maintained between the first inlet vents (51) and the first outlet vents (52) comprising at least one venting vane by virtue of the position thereof, and additional electrically driven fan or impeller is not required thereby saving the manufacturing, maintenance cost of the vehicle. The first inlet vents (51) are used to receive the outside ambient air and circulating the same to the power train system using the first outlet vents (52) comprising the said venting vane by virtue of forward motion of the vehicle and thereby reducing the resistance of the vehicle to wind.

Figure 3:
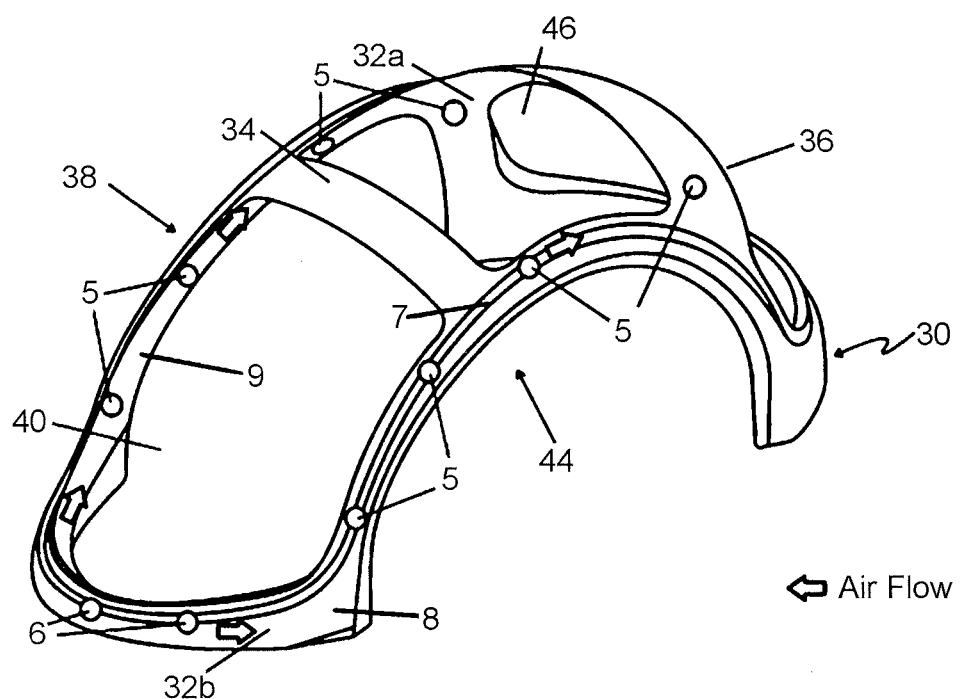
FIG. 3 illustrates how the air is circulated in the upper portion of the rotomolded body assembly of the vehicle according to various embodiments of the invention.

FIG. 3 illustrates how the air is circulated in the upper portion of the rotomolded body assembly of the vehicle according to various embodiments of the invention. The upper body portion 30 is manufactured in identical manner as of lower body portion 10 that is by rotational molding process. The upper body portion 30 also uses foam layer to strengthen the structure. The upper body portion 30 has multiple openings for different components of the automobile vehicle to fit into. An opening for front glass 40, opening for top glass 46 and opening for rear glass 36 is provided to fix respective glasses (wind shields) onto the upper body portion 30. Openings for doors 38 & 44 are provided to attach doors onto the body structure of the automotive vehicle. A header 34 is optimized onto the upper body portion 30 in such a way that it provides maximum upward vision to the driver of the automotive vehicle.

According to one exemplary embodiment of the invention, the rotomolded interior body voids acts as a ventilation enabler obviating the need of separate ducts. The void occurs in the upper body portion 30 of the rotomolded body assembly (100) by design of the rotomolding process and molding requirements. According to one exemplary embodiment of the invention, at least one second outlet vent (5) comprising an air vent (7) disposed at roof of the rotomolded body assembly (100) for receiving the air from at least one second inlet vent (6) and disposing in the void of the rotomolded body assembly (100) for cooling the passenger area.

According to one exemplary embodiment of the invention, the air circulation in the upper body portion 30 of the rotomolded body assembly (100) of the vehicle takes place in the following manner: the air is received via the second inlet vents (6) disposed at front of the lower body portion 10 of the rotomolded body assembly (100) and then the air is disposed in the void of the rotomolded body assembly (100) for cooling the passenger area via the second outlet vent (5) comprising the air vent (7) disposed at front side and roof of the rotomolded body assembly (100). When air enters through the first inlet vane (51), the air is disposed to underside of air channel 14 of the rotomolded body assembly (100) for cooling of the power train system located beneath air channel 14 via the first outlet vent (52) comprising the said venting vane disposed at the air channel 14 and subsequently the air is received after cooling the power train systems by the first outlet vent (52) disposed at the back side of the air channel 14 of the rotomolded body assembly (100) are shown in the FIG. 2 and then disposing the same to the outside of the vehicle by virtue of the forward motion of the vehicle. According to one embodiment of the invention, high volumetric throughput pressure is maintained between the first inlet vent (51) and the second inlet vent (6), and the first outlet vent (52) and the second outlet vent (5) at the lower body portion (10) and the upper body portion (30), respectively by virtue of the position thereof, and additional electrically driven fan or impeller is not required thereby saving the manufacturing, maintenance cost of the vehicle. The first inlet vent (51) and the second inlet vent (6) are used to receive the outside ambient air and circulating the same in the passenger area using first outlet vent (52) and the second outlet vent (5) by virtue of forward motion of the vehicle and thereby reducing the resistance of the vehicle to wind.

According to one exemplary embodiment of the invention, first inlet vent (51) and the second inlet vent (6) are used to receive the outside ambient air and then disposes some portion of the air to first outlet vent (52) and the second outlet vent (5) disposed at the air channel 14 and the air vent (7), disposed at bottom and at the roof of the rotomolded body assembly (100) due to forward motion of the vehicle for cooling of the power train systems and the passenger area respectively.

The preceding description has been presented with reference to various embodiments of the invention. Persons skilled in the art and technology to which this invention pertains will appreciate that alterations and changes in the described structures, systems and methods of operation can be practiced without meaningfully departing from the principle, spirit and scope of this invention.

ADVANTAGES OF THE INVENTION

1) The air circulation system of the present invention replaces the need of a separate electrically driven fan or impeller and thereby utilizing the forward motion of the vehicle and reducing the manufacturing, maintenance cost of the vehicle.
2) The rotomolded interior body voids of the present invention acts as a ventilation enabler obviating the need of manufacturing and installing separate ducts as well as typical additional vents and channels.

We claim:
1. A vehicle comprising:
a roto-molded body assembly including:
a lower body portion having a first inlet vent and a raised securing element, the first inlet vent being positioned at a front side of the lower body portion, the lower body portion comprising an inner skin, an outer skin, and a foam, the foam being disposed between the inner skin and the outer skin for structural stiffness and structural strength of the lower body portion;
an upper body portion mounted on the lower body portion, the upper body portion being secured to the raised securing element of the lower body portion, the upper body portion having an exterior side and an interior side;
an air channel disposed on the lower body portion and coupled to the first inlet vent, the air channel having first outlet vents disposed across a length of the air channel, wherein a power train system is located beneath the air channel; and
an air vent integrally located in the upper body portion, the air vent being sandwiched between the exterior side and the interior side of the upper body portion, the air vent including a second inlet vent and second outlet vents located across a length of the air vent, wherein
the second outlet vents are located on the roof of the roto-molded assembly,
air is received through the first inlet vent and the second inlet vent disposed adjacent to each other when the lower body portion and the upper body portion are assembled, and
some portion of the air is disposed out through the first outlet vents on to the power train system located beneath the air channel and a remaining portion of the air is disposed out through the second outlet vents into an interior passenger area formed between the upper body portion and the lower body portion upon assembly in order to enable air circulation and ventilation in the roto-molded body assembly.

2. The vehicle of claim 1, wherein the air channel is positioned centrally from the front side of the lower body portion to a rear side of the lower body portion.

3. The vehicle of claim 1, wherein the roto-molded body assembly is made using at least one of a polyethylene, a polypropylene or a polymide.

4. The vehicle of claim 1, wherein the first inlet vent comprises a filter for filtering one or more of particles, odor, and water.

5. The vehicle of claim 1, wherein the first inlet vent comprises a closing means for closing the first inlet vent.

6. The vehicle of claim 5, wherein the closing means is one of a flap and a sliding window.

7. The vehicle of claim 1, wherein the first inlet vent and the second inlet vent touch each other when the lower body portion and the upper body portion are assembled.

* * * * *